Patented Mar. 3, 1925.

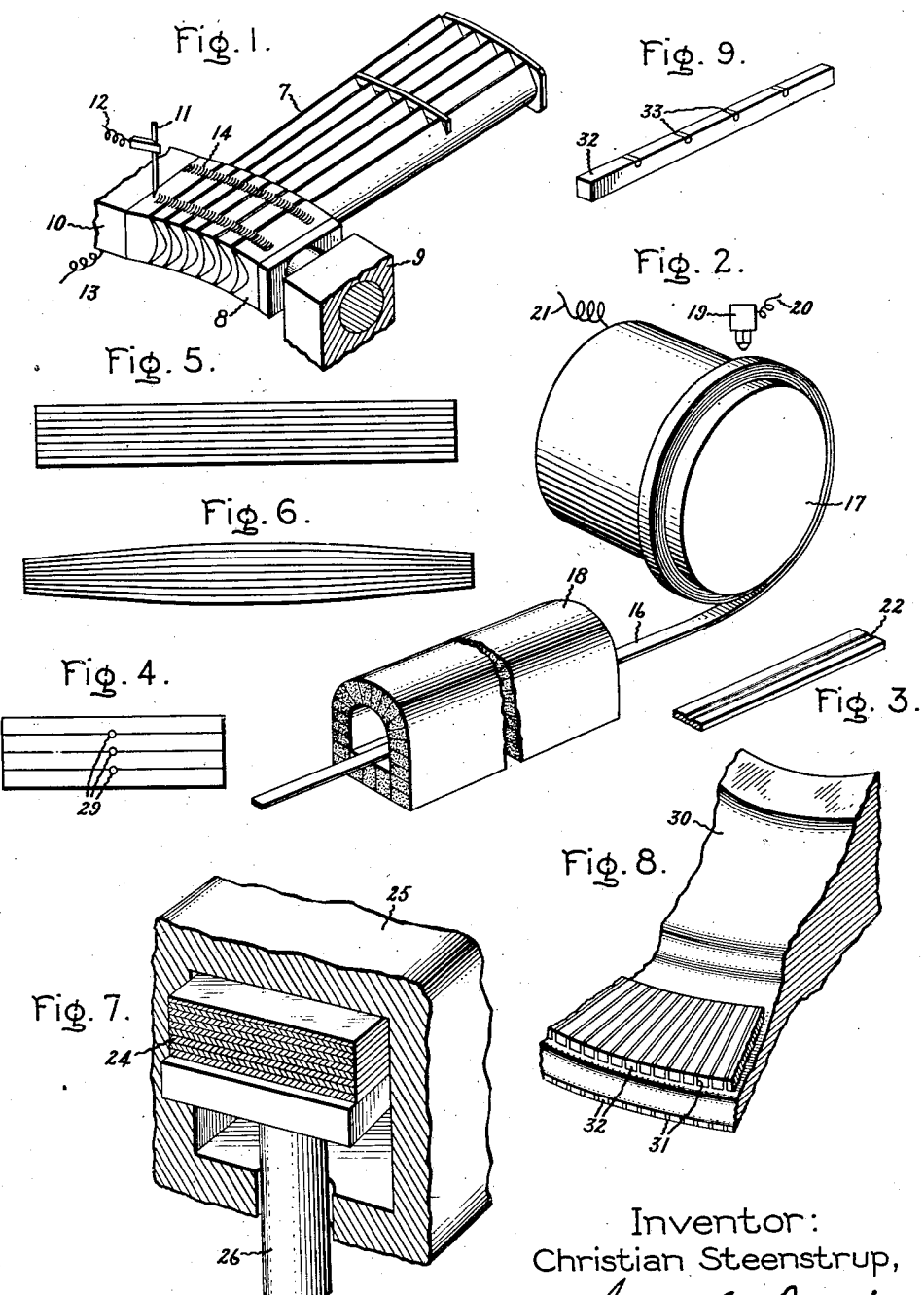

1,528,581

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

COMPOSITE METAL ARTICLE AND ITS METHOD OF MANUFACTURE.

Application filed January 26, 1920. Serial No. 354,014.

*To all whom it may concern:*

Be it known that I, CHRISTIAN STEENSTRUP, a citizen of the United States, residing at Schenectady, in the county of Schenectady, State of New York, have invented certain new and useful Improvements in Composite Metal Articles and Their Method of Manufacture, of which the following is a specification.

This application is a continuation in part of my prior application Serial No. 307,184, filed June 27, 1919.

The present invention comprises composite metal articles having equal or greater strength than unitary articles of the same dimensions, and includes a process of joining metals to each other.

One of the objects of my invention is to produce composite articles adapted to withstand centrifugal forces when being rotated at high speeds, for example, rotors for turbines, high frequency alternating current generators, or the like.

In accordance with my invention the desired composite articles are produced by bringing the surfaces to be joined into intimate contact under pressure, in some cases bonding the same to maintain a close contact and uniting the juxtaposed metals by means of a strong interstitial alloy. The novel features of my invention are pointed out with greater particularity in the appended claims. For a complete understanding of my invention references should be had to the following specification taken in connection with the accompanying drawing.

In the drawing, Fig. 1 illustrates my invention applied to the uniting of turbine blades with space blocks to form a group of turbine buckets solidly joined at their ends; Fig. 2 illustrates the manufacture of a composite metal ring, Fig. 3 showing a detail used in some cases to introduce alloying metal; Fig. 4 illustrates a structural modification; Figs. 5 and 6 show the changes produced by mechanically working articles embodying my invention; Fig. 7 illustrates the formation of an article under pressure; Fig. 8 illustrates my invention applied to the construction of a high frequency rotor; and Fig. 9 is a detail view of one of the bars used in the rotor construction.

According to one of the methods of carrying out my invention, the articles to be joined, for example, the ends of the turbines buckets 7 and space blocks 8 shown in Fig. 1, are mechanically fitted together with great nicety. The articles thus assembled are then subjected to pressure, for example, by means of a hydraulic ram 9 of suitable construction operating against a mechanical stop 10. When the buckets and space blocks are thus assembled under pressure the adjoining surfaces make practically a perfect metal to metal contact, the intervening spaces being materially less than a mil in width and in fact being immeasurably small. While in this close contact the articles are bonded together in some suitable manner, for example, by means of arc welding, preferably both sides being welded while pressure is maintained.

Preferably a bond is made by depositing metal from a fusible electrode 11 consisting of steel or other suitable material, electrical connections 12, 13 to a source of welding current being made as indicated. As the bonding metal 14 is deposited by the arc in a fused state it assists, when cooling and shrinking as a consequence, in drawing together the assembled articles. When the pressure is removed the turbine bucket ends and spacing blocks are maintained by the weld in such intimate contact that the interstitial spaces are immeasurably small. The composite metal body while thus bonded is brought into contact under reducing conditions, preferably in hydrogen, with a metal capable of alloying with the metal surfaces to be joined, for example, copper, nickel or copper alloy. This may be done in a simple manner by simply placing a wire or ribbon of the alloying metal upon the article and raising the temperature in a reducing atmosphere to somewhat above the melting point. I find that under these conditions molten metal will be drawn into the interstitial spaces no matter how narrow they may be and will form an alloy uniting the abutting surfaces, which is homogeneous throughout and has as a whole materially greater tensile strength than a film of the same brazing metal of greater thickness formed without maintained pressure. If the space between the abutting surfaces is made small enough substantially no unalloyed metal will be present in the space and the contiguous surfaces are solidly united by interpenetrating crystals of alloy and none of the metal introduced remaining as such in the joint. The bonding metal deposited by the arc may be removed from the finished article by machining.

When a joint thus formed between two steel bodies by means of copper is pulled apart in a testing machine, the tear will more often be formed in the steel itself than in the joint, showing that the joint has a tensile strength greater than steel. Copper has a tensile strength of about 30,000 pounds per square inch. Ordinarily the resulting interjacent cupreous alloy has a tensile strength about double that of copper. When the objects to be joined consist of nickel-steel, the tensile strength is usually materially higher, about four times the tensile strength of copper. Apparently in this case a bonding alloy is formed containing nickel as well as iron and copper.

A microphotograph of the joint shows a zone of interpenetrating crystals uniting the two surfaces, there being no evidence of unalloyed copper. Long continued contact with mercury does not produce appreciable solution of the metal constituting the joint.

My invention may be applied to the forming of a ring by winding upon itself relatively thin ribbon of suitable ferrous metal, bonding the same at suitable intervals by spot welding, or in any other suitable manner, and forming an interstitial alloy to unite adjoining surfaces. As shown in Fig. 2 a ribbon 16 of steel, or the like, is wound upon a mandrel 17, preferably in a heated condition, so that upon cooling the shrinking stresses will reduce the spaces intervening between the successive layers of ribbon. With this end in view the ribbon is passed through a muffle furnace 18 just before being wound upon the mandrel. The ribbon 16 is spot welded at suitable intervals, perhaps only at the beginning and end of the operation, with a suitable resistance welding electrode 19, the mandrel 17 completing the electric circuit between conductors 20, 21. When the ring formed by winding up the ribbon 16 has been built up to a desired thickness and the end of the ribbon has been fixed as by spot welding, the resulting laminated ring is slipped from the mandrel 17 and an interstitial alloy is formed in a reducing atmosphere, as already described in connection with the manufacture of the composite body shown in Fig. 1. I find that under these conditions molten cooper will penetrate the most minute crevices and will spread uniformly over every part of the adjoining surfaces no matter how small the intervening spaces may be. The alloying material may be introduced as a thin coating or powder, or inserted in a groove 22 of the ribbon (Fig. 3) before or during winding of the ribbon.

Upon cooling the finished ring may be mechanically worked, heat treated, and otherwise handled as a unitary body. It is materially stronger than a unitary body of the same dimensions. The mechanical strength of a composite body consisting a pack of a relatively thin laminæ is due to several causes. In the first place, metal which has been reduced in thickness by mechanical working is rendered stronger by this working. In the second place, the alloying metal may improve the strength of the metal, particularly when in thin ribbons. This is particularly true of copper and nickel. A composite body consisting of laminæ of mild steel, too low in carbon content to otherwise permit of hardening by heat treatment when subjected to molten copper in hydrogen in accordance with my invention may be hardened by heat treatment. The fact that any minute flaw in the material is prevented from spreading when the body is subjected to vibration, or distorting mechanical forces of any sort, is another factor increasing the strength of the composite metal. A flaw can extend no further than through a small section of the material, the adjoining layers being separated by a strong interstitial alloy which has a different constitution than the material of the laminæ forming the body.

My invention may be embodied in the construction of wire wound guns. The guns are wound preferably with square strips of desired width and thickness and after winding, the mass is brought into contact with molten alloying metal, preferably copper, in a reducing atmosphere. Guns wound with round wire may be treated similarly.

As shown in Fig. 7, my invention may be applied to the manufacture of bodies of any desired size consisting of a plurality of laminæ, by placing a pack of sheet material under heavy pressure in a suitable frame and heating the pack thus assembled in a reducing atmosphere in contact with molten cementing metal, preferably copper, in such a manner that the metal may penetrate the minute interstitial spaces between the individual laminations. As shown diagrammatically in Fig. 7, a pack 24 of laminations of steel or the like are held in a frame 25 by a plunger 26 under heavy pressure. The copper is introduced in any suitable way between the contacting surfaces, for example, by depositing a thin layer of copper by electrolysis on one or both surfaces to be united, introducing copper powder between the sheets or allowing molten copper to penetrate the minute interstitial spaces from one of the exposed edges of the pack. In a reducing atmosphere molten copper will penetrate relatively great distances through the most minute space between plane surfaces forced together by heavy pressure. This method of building up composite bodies may be applied to the manufacture of turbine buckets. Sheets of metal having a suitable size and shape are punched out of flat sheets and united under pressure by alloyage. The finishing of the resulting composite body aside from the milling of the blade itself is carried out by a simple broaching operation.

In some cases the strips, plates or sheets joined together as shown in Figs. 2 and 7 may be locked together by inserting a fine wire or strip between said plates or sheets, as shown at 29, Fig. 4, which is caused to imbed itself in the plates or sheets when the metals are plastic to prevent sliding of the laminæ when hot.

It is not essential that the pressure upon the joint or joints be applied before the alloying metal is introduced. In some cases the temperature may be raised to cause the alloying metal to become fluid and a sufficiently high pressure is applied subsequently to produce a joint or joints embodying my invention as described herein.

A composite body consisting of a plurality of sheets as shown in Fig. 5, may be mechanically worked as by pressing or rolling, without destroying its constitution. As shown in Fig. 6 a reduction of diameter of the composite article produced, for example, by pressing, results in a uniform reduction in size of each of the sheets of metal.

Fig. 8 shows how my invention may be applied to the manufacture of a rotor for high frequency generators the general construction of which is described in Alexanderson Patent 1,008,577 of 1911. The rotating inductor 30, only one section of which is shown, as indicated by broken lines, is slotted upon both sides so as to leave upon the surfaces a plurality of poles 31, the spaces between which taper somewhat from the periphery toward the center. Into these spaces, which are carefully made of predetermined dimension, are introduced bars 32 of substantially non-magnetic material such as, for example, non-magnetic steel. When the bars have been all assembled by gentle pressure to fill the intervening spaces between all the poles of the rotor they are driven into the tapered spaces, care being exercised to carry out the operation uniformly upon all the bars. When the bars and the intervening poles of the rotor are thus assembled under pressure they are bonded by peening over the edges of the poles of the rotor which project somewhat above the surface on the non-magnetic steel bars. The rotor as thus built up is heated in hydrogen, or other suitable reducing atmosphere, in contact with molten copper so as to cause the formation of interstitial alloy between the bars of non-magnetic material and the rotor poles, as already described above. Preferably in this case the copper is introduced by providing the bars 32 with a thin film of copper by electrolysis, or any other convenient manner, so as to prevent the formation of an oxide film on the material which is reduced with difficulty. In some cases a small quantity of metal, such as copper or brass may to advantage be placed at intervals in slots made on the surfaces of the bars 32, as indicated at 33, (Fig. 9) but this is not essential. When the joints between the poles and the bars have been completed by alloyage the rotor is finished by machining.

What I claim as new and desire to secure by Letters Patent of the United States, is:—

1. The method of joining objects of metal which consists in fitting the surfaces to be joined, pressing said surfaces into contact while said objects are assembled in a desired position, bonding said objects while assembled under pressure, and finally introducing alloying metal into the joint between said articles in a reducing atmosphere.

2. The method of uniting steel objects which consists in fitting the surfaces to be joined, forcing the surfaces to be joined into contact by pressure while said objects are assembled in a desired position, bonding said objects while so assembled by a superficial deposition of molten metal, and finally introducing molten copper in a reducing atmosphere into the joint or joints between said articles.

3. The method of joining objects of metal more refractory than copper and alloyable therewith which consists in mechanically fitting the surfaces to be joined, forcing said objects at the surface to be welded into contact by pressure, electrically welding said objects over a part only of the area of contact and finally introducing molten copper into the constricted space between said objects.

4. The method of joining objects of ferrous metal which consists in mechanically fitting the surfaces to be joined, holding said surfaces when fitted into contact by pressure, bonding said objects when thus assembled by electric arc welding, and then introducing molten copper in a reducing atmosphere into the constricted space between said objects.

5. An article of manufacture comprising the combination of a plurality of members of ferrous metal having contiguous surfaces joined to each other by a uniform continuous film of alloy coextensive with said surfaces formed at a temperature below fusion of said ferrous metal by the action of a non-ferrous bonding metal which is present in said joint in such small proportion that a fracture has the appearance of ferrous metal, said film having a greater tensile strength than said non-ferrous metal.

6. An article of manufacture comprising a plurality of ferrous metal parts joined to each other by a substantially homogeneous film of bonding alloy which is constituted by crystals comprising copper and iron and having as a whole a tensile strength materially greater than a copper film of the same area.

7. An article of manufacture, a metal body comprising a pack of thin laminæ of ferrous metal united to one another by interpenetrating crystals of metal comprising iron and copper, said body being susceptible of the same heat and mechanical treatment as a homogeneous body of the same composition as said laminæ, but having materially greater mechanical strength than such a homogeneous body.

8. The method of carrying out the joining metal objects in a reducing gas by alloying metal of lower fusing point than said objects, which consists in holding said objects under pressure in such manner that abutting surfaces of said objects are forced into close contact, bonding said objects to maintain said pressure and introducing said alloying metal between said surfaces in a fluid state while held under high pressure whereby the amount of said alloying metal is so restricted that a joint of greater tensile strength than the tensile strength of said alloying metal is produced.

9. The method of carrying out the joining of metal objects in hydrogen by molten copper which consists in exerting and maintaining high pressure between the surfaces thereof which are to be joined when introducing molten copper thereby producing a union therebetween which has a materially greater tensile strength than copper.

10. The method of carrying out the joining of metal objects by an alloying metal of lower fusing point than said objects which consists in placing a quantity of alloying metal in a recess located within the boundaries of the surfaces to be joined, and heating said objects in a reducing gas to a temperature high enough to enable said alloying metal to penetrate the joint between said objects.

11. The method of carrying out the joining of metal objects by copper which consists in placing a quantity of copper in a recess within the boundaries of the surfaces to be joined, holding said objects in contact under high pressure in a hydrogen atmosphere and while, maintaining the pressure, melting the copper to enable the same to penetrate the joint between said objects.

12. An article of manufacture comprising a plurality of ferrous metal members joined to each other at contiguous surfaces by a film of alloy consisting largely of copper and having a tensile strength substantially double the tensile strength of copper.

13. The step in the method of uniting metal objects in a reducing atmosphere by an interjacent brazing metal of lower fusing point alloyable therewith which consists in maintaining said metal objects in such exceedingly close contact at the brazed surfaces while said brazing metal is fluid that the brazing metal is restricted to an amount so small that sufficient alloyage and crystal growing occurs to produce a joint which is substantially homogeneous throughout its whole extent and has a tensile strength materially higher than said brazing metal.

14. The step in the method of uniting ferrous metal objects in a reducing atmosphere by an interjacent cupreous metal which consists in bringing said objects so closely into contact at the brazing surfaces while said cupreous metal is fluid that the cupreous metal in the intervening space is restricted to an amount sufficient only for alloyage with said ferrous metal to produce a joint having a tensile strength substantially double the strength of said cupreous metal.

15. The step in the method of uniting ferrous metal objects in a hydrogen atmosphere by copper which consists in bringing said objects into contact at the surfaces to be joined so closely while the copper is fluid that the copper in the intervening space is restricted to an amount so small that sufficient alloyage and crystal growth occurs to produce a joint having a tensile strength substantially double the strength of copper.

16. The method of forming a ring which consists in winding upon itself relatively thin metal ribbon, welding contacting areas of said ribbon at intervals spaced apart, and then introducing into the crevices between the turns of said ribbon an alloying metal in a reducing atmosphere.

17. The method of forming a metal ring of ferrous metal which consists in winding upon itself thin ferrous metal ribbon in a heated condition, welding contacting areas of said ribbon at intervals spaced apart to bond the same, and introducing into the crevices between the turns of said ribbon a cupreous metal in a hydrogen atmosphere.

18. The method of carrying out the joining of metal objects by an alloying metal of lower fusing point than said objects which consists in placing a quantity of alloying metal in a cavity which is in communication with a crevice between said objects, and heating said objects in a reducing gas to a temperature high enough to cause said alloying metal to fuse and penetrate said crevice.

19. The method of carrying out the joining of metal objects by copper which consists in placing a quantity of copper in a recess which is in communication with a crevice between said objects, holding said objects in contact under pressure in a hydrogen atmosphere, and, while maintaining the pressure, melting the copper to enable the same to penetrate the crevice between said objects.

20. The method of joining objects consisting of ferrous metal which consists in bringing the surfaces which are to be joined, into contact under pressure, bonding said objects while thus assembled by localized electric welding and introducing a brazing metal in a reducing atmosphere into contact with the surfaces to be joined.

21. The method of joining closely fitting surfaces of ferrous metal objects which consists in applying pressure in a direction forcing said surfaces into contact, bonding said objects by electric welding at localized regions spaced apart, and introducing fused copper into the joint between said surfaces in a hydrogen atmosphere.

22. The method of forming a ring which consists in winding upon itself under pressure a metal ribbon, welding said ribbon at regions spaced apart and causing fused copper to penetrate the crevices between adjoining turns of said ribbon in a hydrogen atmosphere, thereby uniting said turns to form a substantially unitary structure.

23. An article of manufacture comprising a ring constituted by a plurality of laminæ of ferrous metal which are united to each other by a cupreous brazing metal, said ring being susceptible to the same heat and mechanical treatment as a homogeneous ring of the same composition as said laminæ.

24. The method of forming a ring which consists in winding upon itself under pressure a metal ribbon, bonding said ribbon at regions spaced apart and causing fused copper to penetrate the crevices between adjoining turns of said ribbon in a hydrogen atmosphere, thereby uniting said turns to form a substantially unitary structure.

In witness whereof, I have hereunto set my hand this 23rd day of January, 1920.

CHRISTIAN STEENSTRUP.